United States Patent [19]
Yamaguchi

[11] Patent Number: 5,119,696
[45] Date of Patent: Jun. 9, 1992

[54] JOLT CONTROL SYSTEM FOR DRIVE SYSTEM

[75] Inventor: Hiroshi Yamaguchi, Yokohama, Japan

[73] Assignee: Nissan Motor Co., Ltd., Yokohama, Japan

[21] Appl. No.: 390,909

[22] Filed: Aug. 8, 1989

[30] Foreign Application Priority Data

Aug. 8, 1988 [JP] Japan .................. 63-196078

[51] Int. Cl.⁵ .................. F16H 59/24; F16H 59/70
[52] U.S. Cl. .................. 74/866; 74/858
[58] Field of Search .......... 74/857, 858, 336 R, 74/872, 867, 868, 866; 364/424.1

[56] References Cited

U.S. PATENT DOCUMENTS

| | | | |
|---|---|---|---|
| 4,266,447 | 5/1981 | Heess et al. | 74/858 |
| 4,403,527 | 9/1983 | Mohl et al. | 74/872 X |
| 4,677,880 | 7/1987 | Hattori et al. | 74/858 X |
| 4,680,988 | 7/1987 | Mori | 364/424.1 X |
| 4,680,992 | 7/1987 | Hayasaki et al. | 74/869 |
| 4,724,723 | 2/1988 | Lockhart et al. | 74/858 X |
| 4,800,781 | 1/1989 | Yasue et al. | 74/851 X |
| 4,811,223 | 3/1989 | Iwatsuki et al. | 74/866 X |
| 4,889,014 | 12/1989 | Iwata | 74/858 |

FOREIGN PATENT DOCUMENTS

| | | |
|---|---|---|
| 182376 | 5/1986 | European Pat. Off. . |
| 228899 | 7/1987 | European Pat. Off. . |
| 61-105235 | 5/1986 | Japan . |
| 61-112850 | 5/1986 | Japan . |
| 62-286846 | 12/1987 | Japan . |
| 2051979 | 1/1981 | United Kingdom . |
| 2104983A | 2/1983 | United Kingdom .......... 74/336 R |
| 2208179 | 3/1989 | United Kingdom . |

OTHER PUBLICATIONS

Nissan Full-Range Automatic Transmission RE4R01A Type Service Manual (A261C07), 1987.

*Primary Examiner*—Allan D. Herrmann
*Assistant Examiner*—Khoi A. Ta
*Attorney, Agent, or Firm*—Foley & Lardner

[57] ABSTRACT

An apparent gear ratio, namely $G = N_T/N_O$, is determined based on transmission input and output revolution speeds $N_T$ and $N_O$ which are detected by sensors. The apparent gear ratio is used to determine whether a shift operation is in progress or not. It is defined that the gear shift operation is in progress when the apparent gear ratio falls between one gear ratio before the shift operation and another gear ratio after the shift operation. The engine output torque is altered, therefore, when the apparent gear ratio falls between one and another gear ratios.

9 Claims, 11 Drawing Sheets

JOLT CONTROL SYSTEM FOR DRIVE SYSTEM

BACKGROUND OF THE INVENTION

The present invention relates to a jolt control system for a drive system including a prime mover and an automatic transmission.

It is known to reduce a shift shock by momentarily altering the output torque of a prime mover which an automatic transmission is associated with. If the timing of the start and end of this change in the output torque of the prime mover fails to occur during a period beginning with the start and ending with the termination of the shift operation, this output torque change takes place outside the period where the shift operation progresses, such as before the start of the shift operation or after the termination or completion of the shift operation. This may cause a large shift shock or result in degraded driving performance.

U.S. Pat. No. 4,266,447 teaches the detection of the start and termination of a shift operation by monitoring the revolution speed of an output shaft of the prime mover. This known method requires a data map which a synchronizing speed value is taken from. This data map has to be designed to take due consideration of the situation where the vehicle speed changes during the shift operation or the situation where the wheel acceleration varies during the shift operation.

An object of the present invention is to provide a jolt control system which is improved such that the period of a shift operation is detected accurately under any circumstances.

SUMMARY OF THE INVENTION

According to the present invention, an apparent gear ratio, namely a ratio of the transmission input revolution speed to the transmission output revolution speed, is determined based on sensor output signals of transmission input revolution speed and output revolution speed sensors. The engine output torque is altered when the apparent gear ratio falls between two gear ratios established before and after a shift operation, thus providing a shock-less shift operation.

According to one aspect of the present invention, there is provided a jolt control system for a drive system including an engine, a torque converter, and an automatic transmission to which the engine output torque is transmitted through the torque converter, the automatic transmission being subjected to a shift operation from one speed with a first gear ratio to another speed with a second gear ratio, the automatic transmission having a transmission output shaft and a transmission input shaft which is drivingly connected via the torque converter to the engine, the jolt control system comprising; transmission input revolution speed sensor means for detecting a revolution speed of the transmission input shaft and generating a transmission input revolution speed indicative signal, transmission output revolution speed sensor means for detecting a revolution speed of the transmission output shaft and generating a transmission output revolution speed indicative signal; means for determining an apparent gear ratio based on said transmission input and output revolution speed indicative signals and generating a shift operation indicative signal when said apparent gear ratio falls between the first and second gear ratios, and means for causing the engine to temporarily alter output torque thereof in response to said shift operation indicative signal.

According to another aspect of the present invention, there is provided a jolt control method for a drive system including an engine, a torque converter, and an automatic transmission to which the engine output torque is transmitted through the torque converter, the automatic transmission being subjected to a shift operation from one speed with a first gear ratio to another speed with a second gear ratio, the automatic transmission having a transmission output shaft and a transmission input shaft which is drivingly connected via the torque converter to the engine, the jolt control method comprising the steps of; detecting a revolution speed of the transmission input shaft and generating a transmission input revolution speed indicative signal, detecting a revolution speed of the transmission output shaft and generating a transmission output revolution speed indicative signal, determining an apparent gear ratio based on said transmission input and output revolution speed indicative signals and generating a shift operation indicative signal when said apparent gear ratio falls between the first and second gear ratios, and causing the engine to temporarily alter output torque thereof in response to said shift operation indicative signal.

DETAILED DESCRIPTION OF THE INVENTION

Hereinafter, the invention will be described in detail with reference to the drawings.

Figure 1:
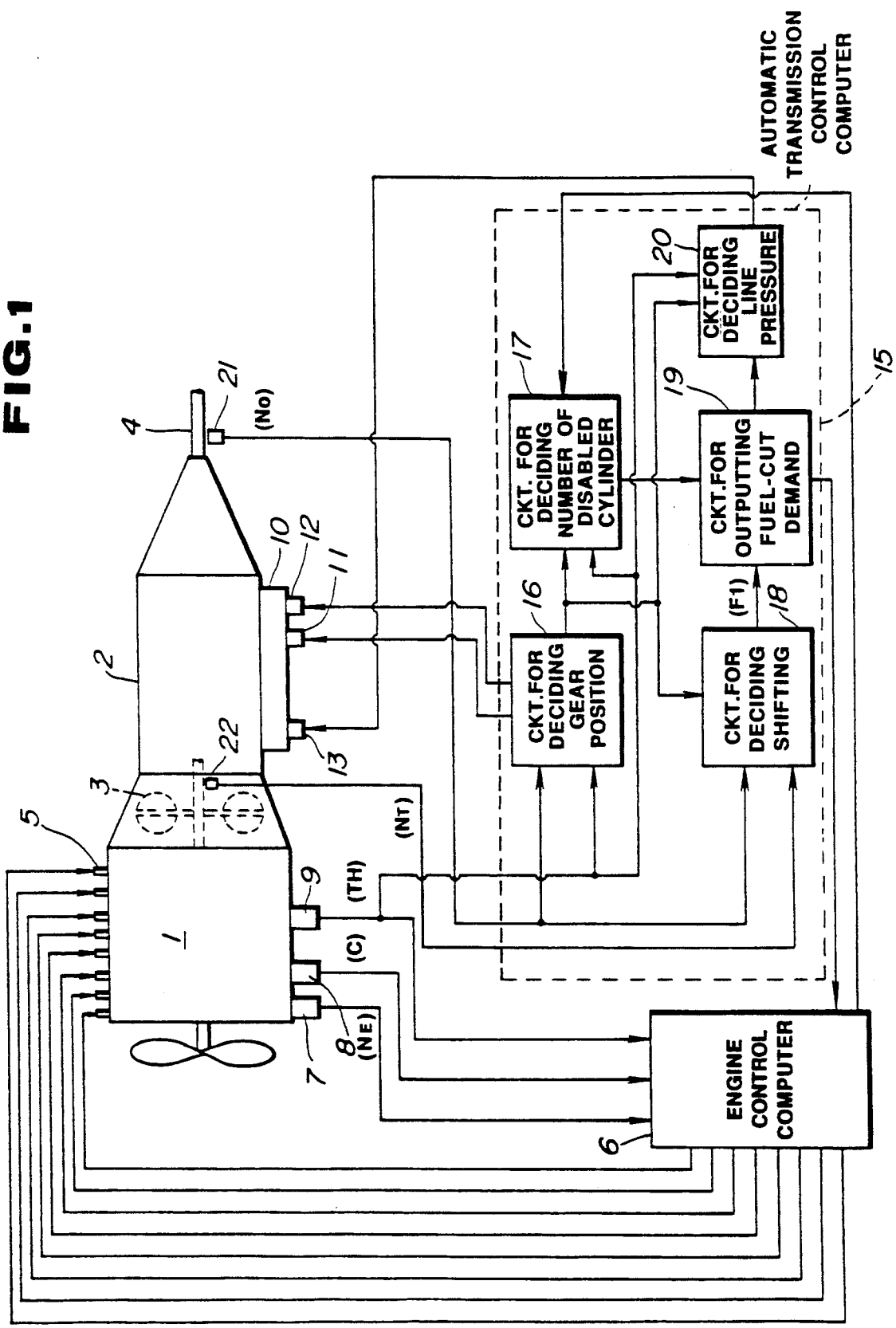
FIG. 1 is a block diagram of a drive system with a jolt control system according to the present invention.

FIG. 1 shows one embodiment of a jolt control system according to the invention, in which 1 denotes an engine serving as a prime mover and 2 denotes an automatic transmission. The power of the engine 1 is delivered through a torque converter 3 to the automatic transmission 2, which allows delivery of the power to a transmission output shaft 4 in a manner to drive the driving wheels of the vehicle in accordance with a gear ratio provided by the gear position established in the automatic transmission. The engine 1 is an eight-cylinder engine having eight fuel injection valves 5 for eight cylinders, respectively. These fuel injection valves 5 are opened or closed by an engine control computer 6. The computer 6 calculates and determines the amount of fuel to be injected in response to an engine speed indicative signal sent from an engine speed sensor 7 which detects the engine crankshaft revolution speed $N_E$, an engine coolant temperature indicative signal from an engine coolant temperature sensor 8 which detects a temperature C of an engine coolant, and a throttle opening degree indicative signal from a throttle sensor 9 which detects a throttle opening degree TH representative of an engine load. Then, the computer 6 operates to individually open each fuel injection valve 5 for a duration of time which is variable with variations in the engine speed $N_E$ for allowing fuel to be injected to the corresponding cylinder of the engine 1. When the output torque of the engine 1 is reduced while the automatic transmission 2 is shifting in gear position, a fuel supply to some cylinder or cylinders is cut to disable the same.

The automatic transmission 2 has a control valve assembly 10. The control valve assembly 10 has a first shift solenoid 11, a second shift solenoid 12, and a line pressure solenoid 13. The shift solenoids 11 and 12 are rendered ON (energized) and/or OFF (deenergized) or vice versa in a manner as tabuleted in Table 1 as follows:

TABLE 1

|  | First Shift Solenoid 11 | Second Shift Solenoid 12 |
| --- | --- | --- |
| First Speed | ON | ON |
| Second Speed | OFF | ON |
| Third Speed | OFF | OFF |
| Fourth Speed | ON | OFF |

In this case, the servo activating hydraulic pressure for respective friction elements is a line pressure which is generated as a result of pressure regulation under the control of the line pressure solenoid 13 that is duty controlled. During a shift operation, the capacity of a friction element to be hydraulically activated is controlled by temporarily modulating the line pressure.

The on-off control of the solenoids 11, 12 and the duty control of the line pressure solenoid 13 are executed by an automatic transmission control computer 15. The computer 15 performs various functions which may be illustrated by circuits or stages 16, 17, 18, 19 and 20 for deciding the gear position, for deciding number of disabled cylinders by fuel-cut, for detecting gear shifting, for outputting demand for fuel-cut, and for deciding line pressure.

The automatic transmission mentioned above is of the RE4R01A type described in "NISSAN FULL-RANGE AUTOMATIC TRANSMISSION RE4R-01A TYPE, SERVICE MANUAL, (A261C07)" issued on March, 1987 by NISSAN MOTOR COMPANY LIMITED. The automatic transmission of the above mentioned type is also disclosed in U.S. Pat. No. 4,680,992 (Hayasaki et al.) which is hereby incorporated in its entirety by reference.

In order to make clear the functions attributed to the circuits or stages shown in FIG. 1, the flowcharts shown in FIGS. 2, 4, 6 and 7 of programs are explained, although these programs are stored in a read only memory (ROM) of the automatic transmission control computer 15 and executed under the control of a central processing unit (CPU).

At the circuit or stage 16, a desired shift in gear position is determined by looking up a predetermined shift pattern table using the throttle opening degree indicative signal TH (engine load) and the transmission output shaft revolution speed indicative signal $N_O$ (vehicle speed) and controls the ON/OFF state of the shift solenoids 11, 12 to establish the gear position desired.

Figure 2:
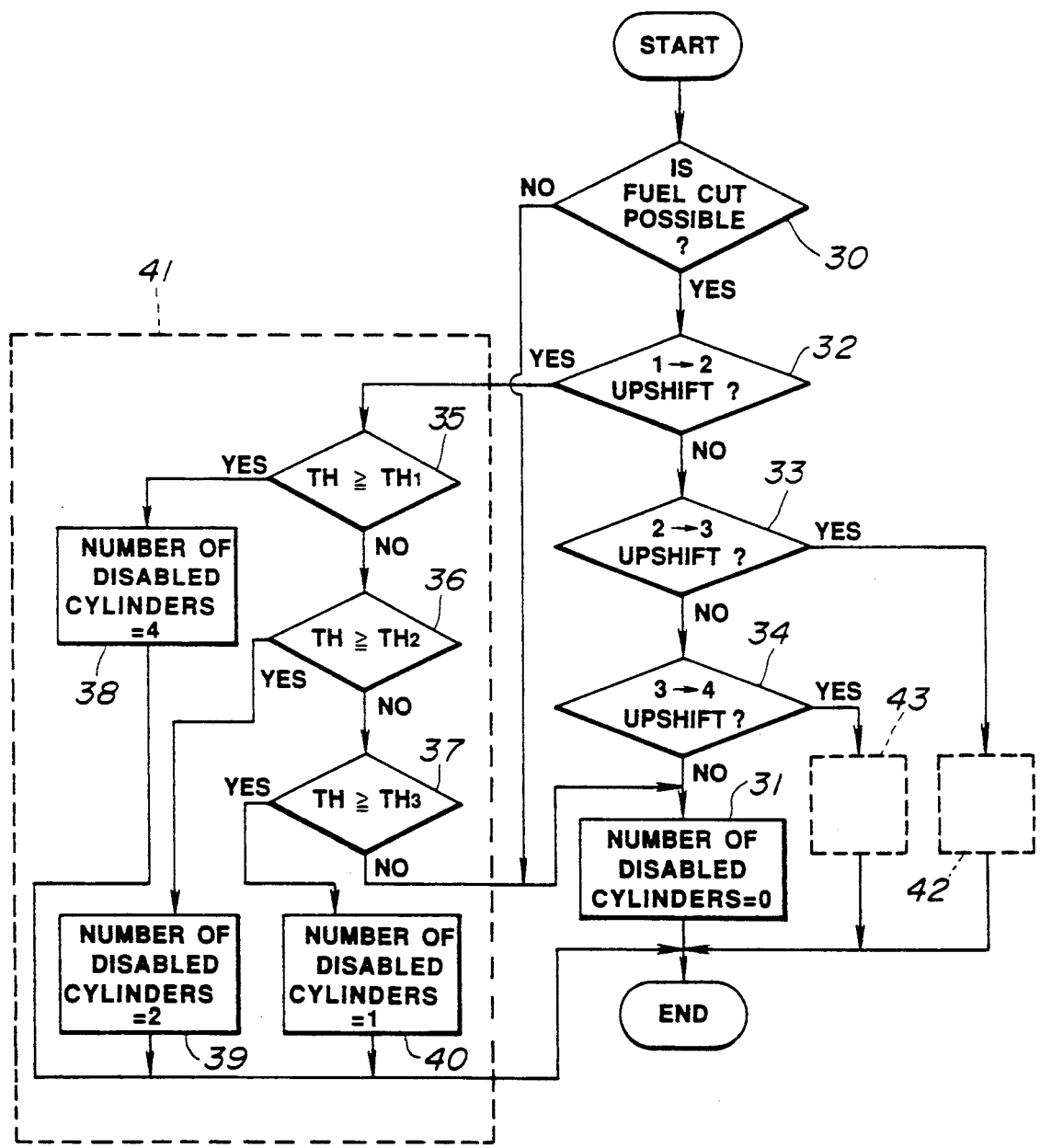
FIG. 2 is a flowchart of a program for determining the number of cylinders to be disabled by fuel-cut operation.

Referring to the flowchart shown in FIG. 2, the function of the circuit or stage 17 is explained. Supplied to this stage 17 are the signal indicative of the desired shift determined at the circuit 16, the throttle opening degree indicative signal TH from the sensor 9, and a fuel-cut enable signal from the engine control computer 6. In FIG. 2, at a step 30, it is determined whether the fuel-cut operation is possible or not by checking whether or not the engine speed $N_E$ is greater than or equal to a predetermined value, a coolant temperature C is higher than or equal to a predetermined value, and there is issued the fuel-cut enable signal from the engine control computer 6. If it is determined that the fuel-cut operation is not possible, the number of cylinders to be disabled (viz., disabled cylinder) to zero at a step 31. If possible, the program proceeds to steps 32 to 34 to determine which of different types of shift the desired shift determined at the stage 16 belongs to. If the desired shift determined at the stage 16 is a downshift or no shift is required, the program proceeds through all of the steps 32, 33 and 34 to the step 31 where the number of disabled cylinders is set to 0 (zero) since this is where the engine output reduction control is not required.

Figure 3:
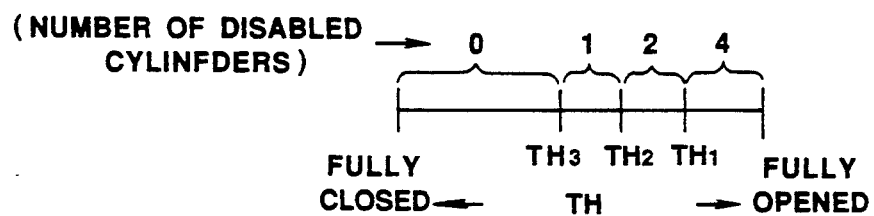
FIG. 3 is a chart illustrating the number of disabled cylinders versus variation in throttle opening degree (TH)

If the desired shift determined is found to be a 1-2 upshift at the step 32, it is determined at steps 35 to 37 which of four regions the throttle opening degree TH falls in. As shown in FIG. 3, these four regions correspond to different numbers of disabled cylinders, respectively, and thus are used for evaluating the number of disabled cylinders for effective reduction of the shift shock during the 1-2 upshift operation. If $TH \geq TH_1$, the number of disabled cylinders is set to 4 at a step 38 to allow the fuel-cut to four cylinders. In the case of $TH_1 > TH \geq TH_2$, the number of disabled cylinders is set to 2 at a step 39 to allow fuel-cut to two cylinders. If $TH_2 > TH \geq TH_3$, the number of disabled cylinders is set to 1 at a step 40 to allow the fuel-cut to one cylinder. If $TH < TH_3$, the number of disabled cylinders is set to 0 (zero) at the step 31 to prohibit fuel-cut operation.

If the desired shift determined at the stage 16 is found to be a 2-3 upshift at the step 32 or a 3-4 upshift at the step 34, a similar control to the control enclosed by a block 41 is executed at a step 42 or 43, although $TH_1$, $TH_2$ and $TH_3$ are set to different values. As an now be appreciated, the different numbers of disabled cylinders are set for different types of shift operations in order to effectively reduce the shift shock, respectively.

Figure 5:
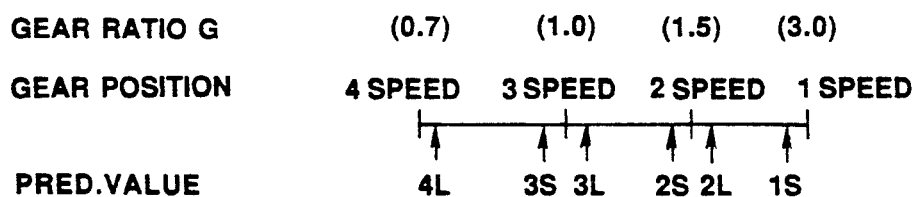
FIG. 5 is a chart illustrating the number of disabled cylinders versus variation in throttle opening degree (TH)
Figure 4:
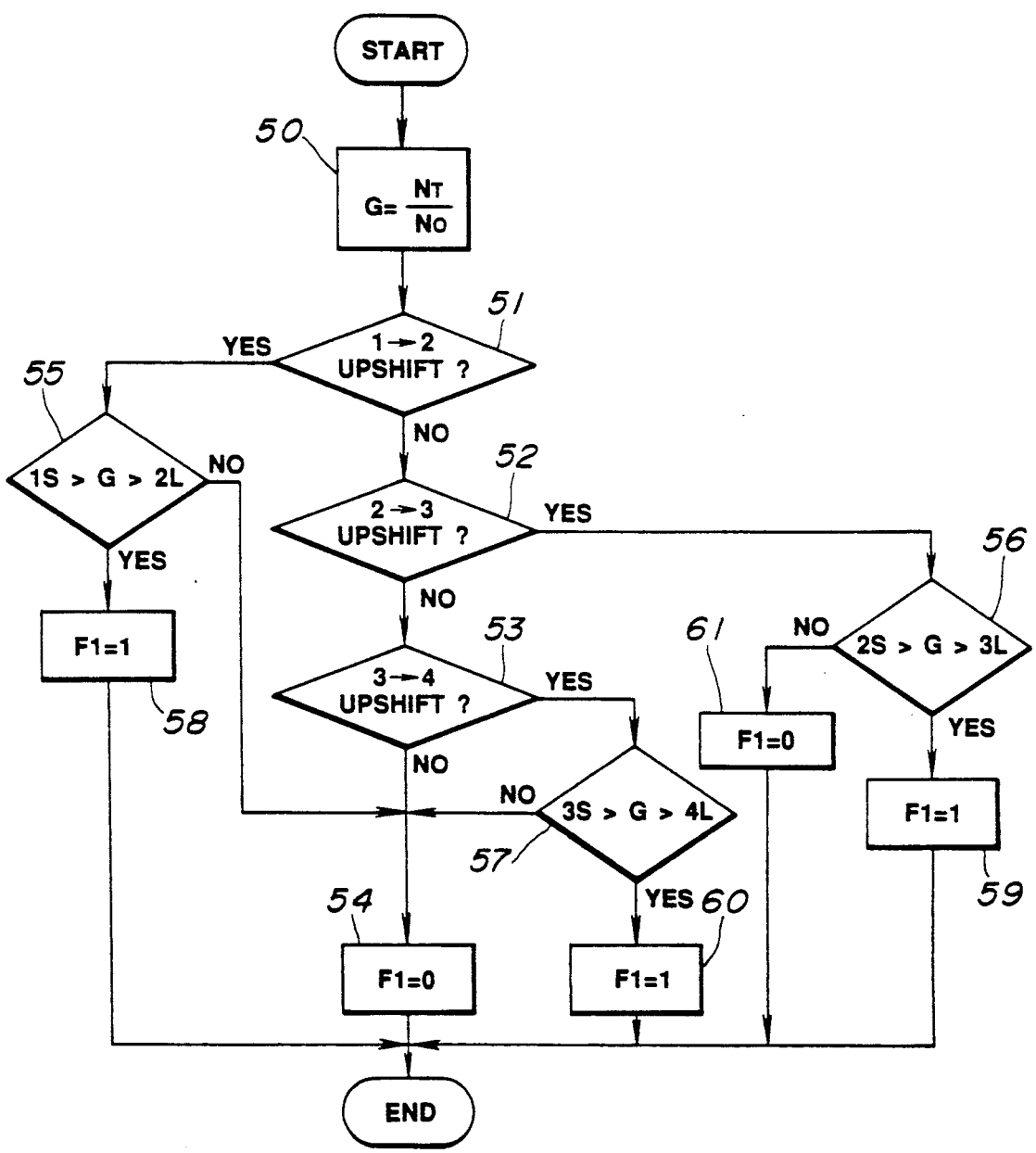
FIG. 4 is a flowchart of a program for detecting gear position.

Referring to FIG. 4, the function to detect gear shifting performed at the stage 18 is explained. Supplied to this stage 18 are the transmission input shaft revolution speed $N_T$, the transmission output shaft revolution speed $N_O$ and the desired shift determined at the stage 16. In FIG. 4, at a step 50, an apparent gear ratio $N_T/N_O$ is calculated. Then, the type which the desired shift determined at the stage 16 belongs to is evaluated at steps 51 to 53. If the desired shift determined at the stage 16 is found to be a downshift or no shift is required, it is unnecessary to reduce the engine output during the shift operation. Thus, a flag F1 indicating that the shift operation is under progress is reset to 0 (zero). If the desired shift is any one of a 1-2 upshift, a 2-3 upshift, or a 3-4 upshift, the gear ratio G is checked at the corresponding one of steps 55, 56, and 57 to determine whether or not the upshift operation progresses. Reference should be made to FIG. 5 in this regard. If it is determined that the upshift operation is under progress, the flag F1 is set to 1 at the corresponding step 58 or 59 or 60. If it is found that the upshift operation is not yet initiated or completed, the flag F1 is reset to zero at the corresponding step 54 or 61.

Figure 6:
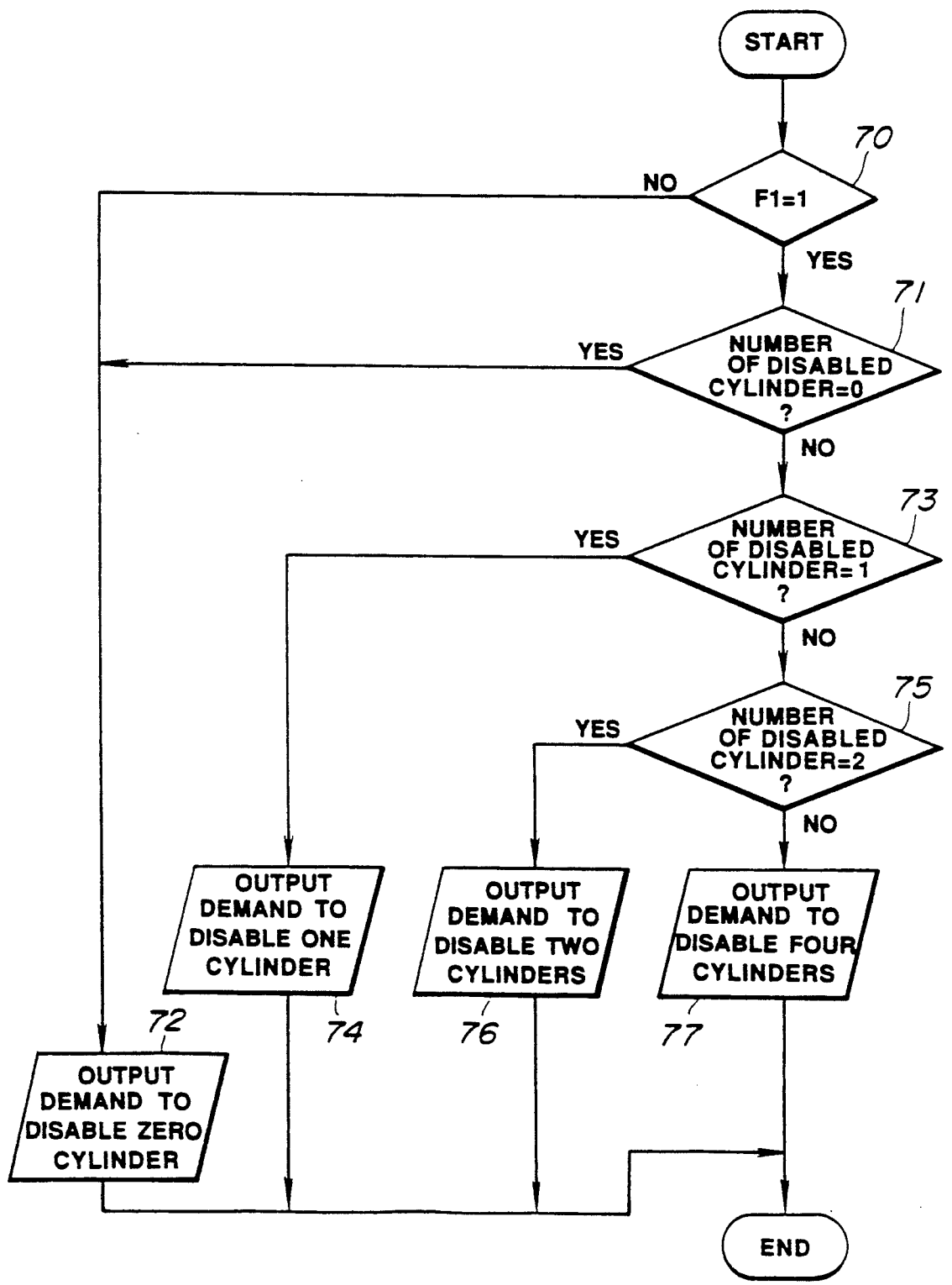
FIG. 6 is a flowchart of a program for outputting demand for fuel-cut.

Referring to FIG. 6, the function to output demand for fuel-cut operation performed at the circuit or stage 19 is explained. The demand for fuel-cut is fed to the engine control computer 6 to cut fuel supply to some of the cylinders of the engine 1 to urge the engine 1 to reduce output torque thereof. Supplied to the stage 19 are the signal indicative of the state of the flag F1 determined at the stage 18 (see flowchart shown in FIG. 4) and the signal indicative of the number of disabled cylinders set at the stage 17 (see flowchart shown in FIG. 2). In FIG. 6, at a step 70, it is determined whether or not F1=1, that is, whether the upshift is under progress or not. This is to determine when the engine 1 is urged to reduce the output torque thereof for the purpose of reducing the shift shock. If it is determined that the flag F1 is not set, the program proceeds to a step 72 where a demand to disable zero cylinders is outputted, that is, the fuel supply to all of the cylinders is maintained (no fuel-cut). If the flag F1 is found to be set at the step 70, and if the number of disabled cylinders is zero at a step 71, the program proceeds to the step 72 where the demand to disable zero cylinders is outputted to the engine control computer 6. If the number of disabled cylinders is found to be 1 at a step 73, there is outputted a demand to disable one cylinder at a step 74. If the number of disabled cylinders is found to be 2 at a step 75, there is outputted a demand to disable two cylinders at a step 76. If at the step 75 it is determined that the number of disabled cylinders is not 2, there is outputted a demand to disable four cylinders at a step 77. In response to the demand outputted, one or some of the fuel injection valves 5 are closed to disable the number of cylinders demanded under the control of the engine control computer 6 during the upshift operation.

As will now be appreciated from the preceding description, the amount of reduction of output torque of the engine is best matched to the amount of torque reduction for reducing the shift shock which varies with varying operation states of the drive system since the number of cylinders which are to be disabled by fuel-cut is altered in response to the operation state of the drive system (such as, type of shift operation which the automatic transmission is subjected to, and throttle opening degree TH), thus contributing to reduction of shift shock during the shift operation. Besides, whether the upshift operation is in progress or not is accurately determined by the change of the gear ratio G. This assures the synchronization of the occurrence of the engine output torque change with the occurrence of the shift operation, thus eliminating the possibility of inducing a new shock or degrading the driving performance.

The line pressure deciding stage 20 shown in FIG. 1 receives the throttle opening degree TH indicative signal from the sensor 9 to determine the duty which the line pressure solenoid 13 is operated on such that the magnitude of the line pressure is adjusted in response to the throttle opening degree TH.

Although, in the embodiment as stated above, this invention is applied to the case where the engine output torque is reduced to reduce the upshift shock during the upshift operation, it is also possible to apply this invention to the case where the engine output torque is increased (torque-up) and decreased (torque-down) during the downshift operation to reduce the downshift shock as shown in FIGS. 7 to 12.

In this embodiment, the automatic transmission control computer 15 is equivalent to the combination of a gear position deciding circuit 16, a shifting detecting circuit 23, a torque-up demand outputting circuit 24, and a line pressure deciding circuit 25.

The gear position deciding circuit 16 is the same as the circuit shown with the same numeral in FIG. 1. The shifting detecting circuit 23 executes the function as illustrated by the program shown in FIG. 8 on the basis of the revolution speeds $N_T$ and $N_O$ fed from the sensor 22, 21 as well as the type of the gear shift fed from the gear position deciding circuit 16 so as to detect whether the downshift is being under way or not.

Figure 8:
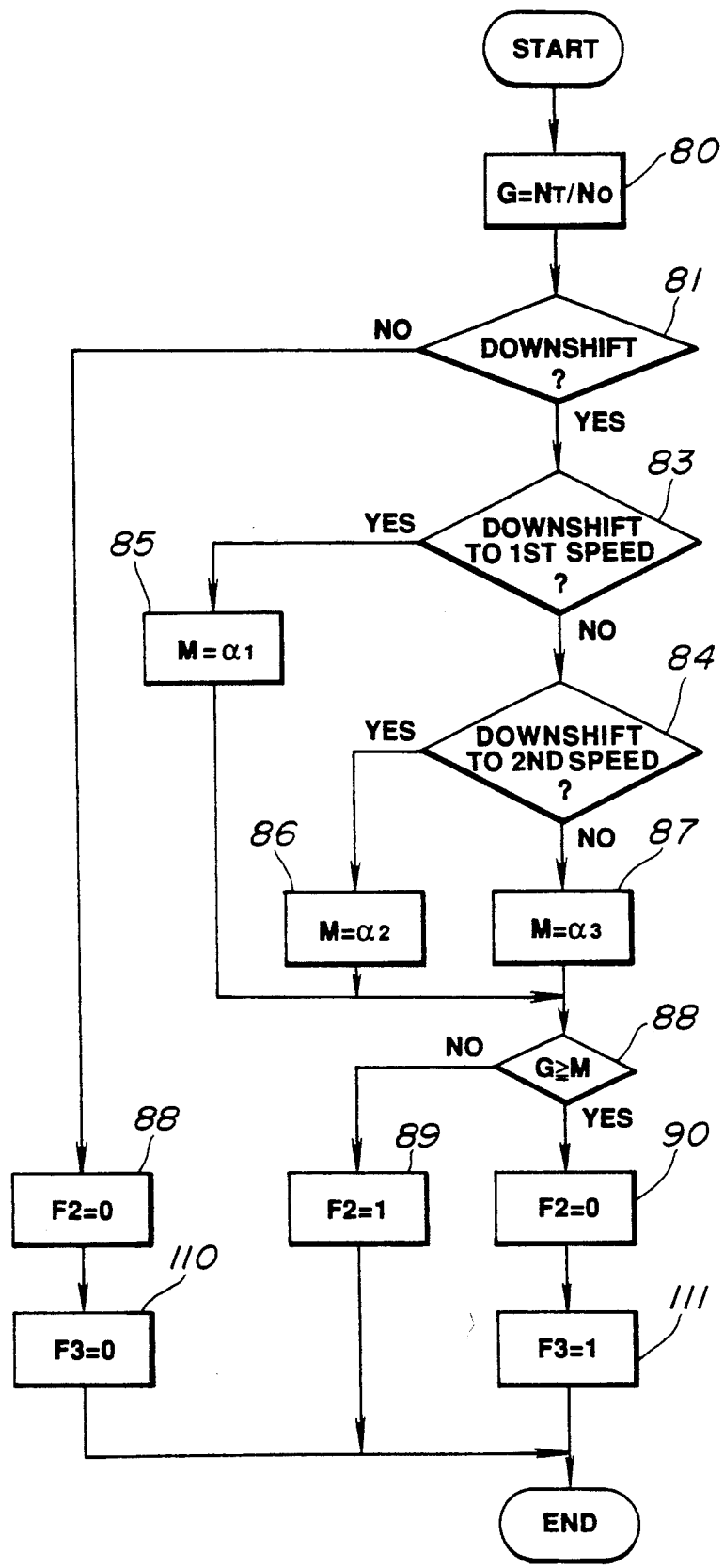
FIG. 8 is a flowchart of a program for deciding a gear position.
Figure 9:
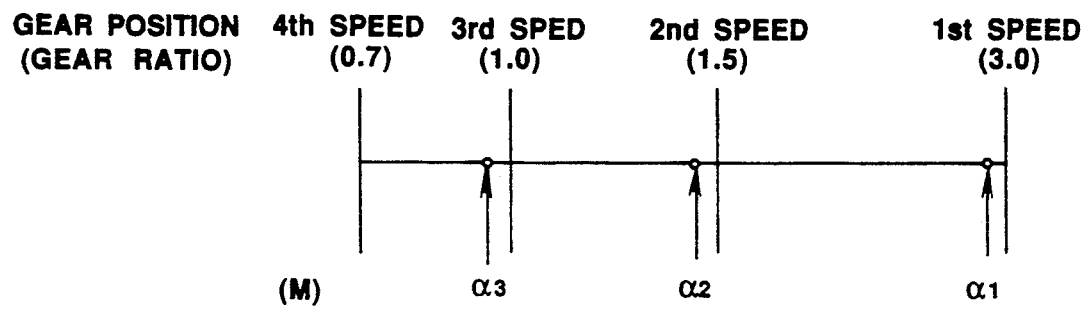
FIG. 9 is a diagram showing the set values of gear ratios which are to be established at the end or termination of different types of downshift operations, respectively.

In the step 80 shown in FIG. 8, the apparent gear ratio $G = N_T/N_O$ is calculated, and in the next step 81, it is checked to see whether a downshift or the other, such as an upshift or non-shifting, is performed. The torque-up operation for reducing the shift shock is not necessary in the upshift or non-shifting so that the flag F2 is reset to 0 in the step 82 to indicate this. If the downshift is performed, it is checked in the step 83, 84 to see whether the downshift is a downshift to the first speed, downshift to the second speed or downshift to the third speed. The gear ratio M for identifying the termination of each downshift is set to $\alpha1$, $\alpha2$ or $\alpha3$ as shown in FIG. 9 in the steps 85 to 87 for each downshift operation. In the step 88, it is checked to see whether or not the shift operation is terminated based on whether the gear ratio G is greater than the set value M or not. If the shift operation is not terminated, namely, the shift is being performed, the flag F2 is set to 1 to indicate this in the step 89. If the shift is terminated, F2 is set to 0 in the step 90 to indicate this. Following F3=0 in the step 90, the flag F2 is set to 1 in the step 111 to indicate the necessity of the torque-down operation.

Moreover, in the step 110, the flag F3 is reset to 0 to indicate that the torque-down operation is not necessary.

Figure 7:
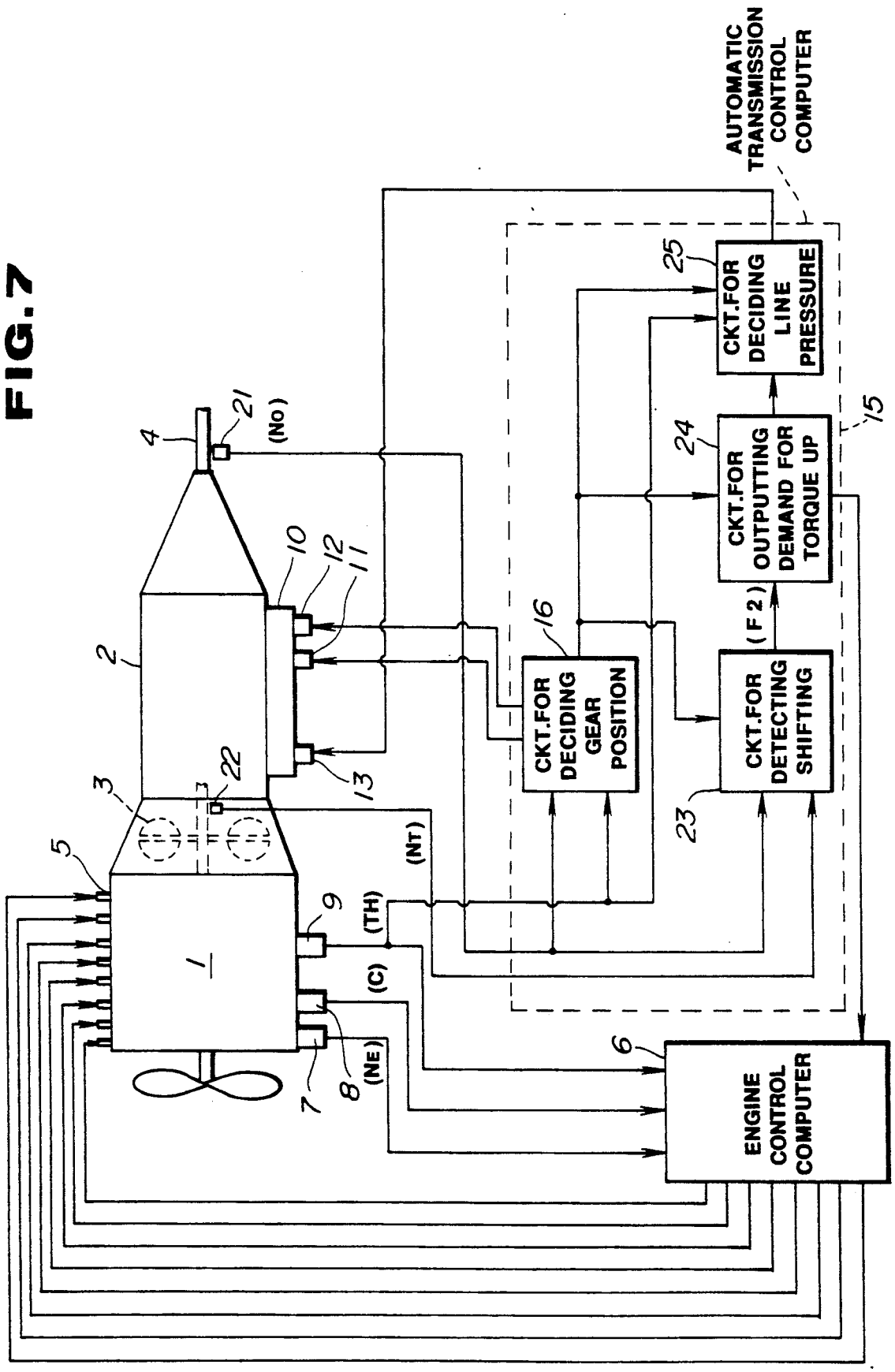
FIG. 7 is a diagram showing another embodiment according to the present invention.
Figure 10:
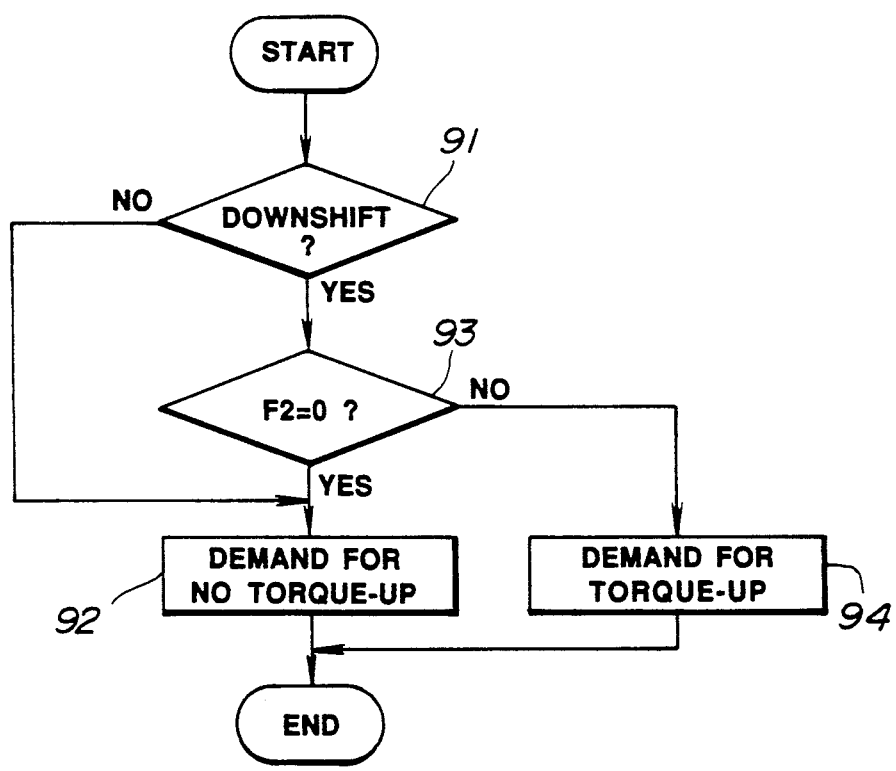
FIGS. 10, 11, and 12 are flowcharts of programs for outputting torque-up demand, for outputting torque down demand, and for deciding the magnitude of line pressure, respectively.
Figure 11:
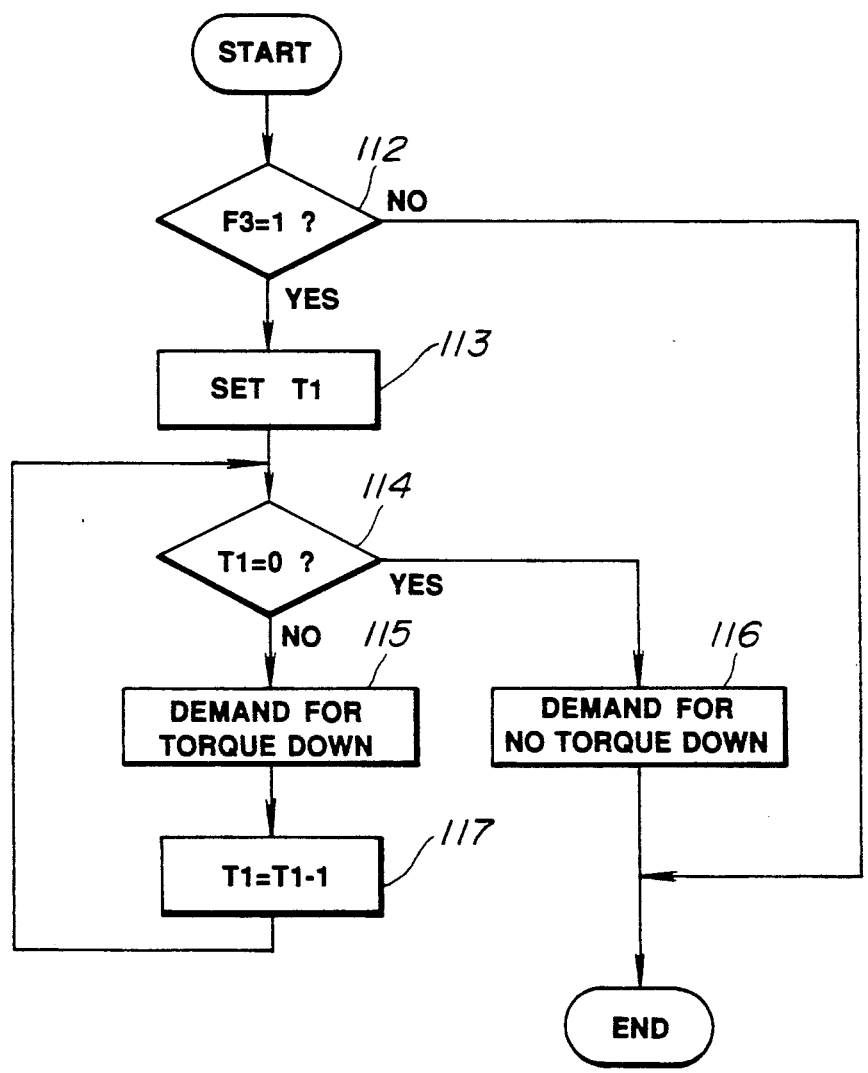

The torque-up demand outputting circuit 24 in FIG. 7 executes the control program shown in FIG. 10 and FIG. 11 on the basis of the information of the flag F2 and the information on the types of the shift fed from the stage 16 to allow the engine control computer 6 to increase the output torque thereof (torque-up) for reducing the downshift shock and to decrease the output (torque-down). Thus, it is checked in the step 91 to see whether the downshift is performed or not, the torque-up demand signal is not fed to the engine control computer 6. In the case of the downshift, it is checked in the step 93 to see whether this shift is performed or not on the basis of the state of the flag F2. During the downshift operation with F2=1, the torque-up demand signal is fed to the engine control computer 6 in the step 94 to urge the torque-up of the engine, thereby reducing the shock during the downshift operation. If the termination of this shift operation is identified in the step 93, the step 92 is executed to prevent the unnecessary torque-up of the engine such that a new shock should not be produced. Furthermore, the flag F3=1 is ascertained in the step 112 shown in FIG. 11 to verify the necessity of the torque-down operation after the torque-up control is terminated.

If the torque-down control is required, a timer T1 is set in the step 113 to perform the torque-down control until the timer T1 reaches 0. In the step 116, the torque-down control is stopped. In the step 117, the count of the timer T1 is decreased by one. This torque-down control is performed to achieve a shock-less and smooth termination of the shift operation by preventing the excessive engine speed increase due to the torque-up control.

The downshift operation is accurately identified with the gear ratio G in the manner as shown in FIG. 8 so that it is now possible to eliminate the fear of producing a new shock or degrading the driving performance by preventing the torque-up control from being performed in an unnecesary period other than that during the downshift operation.

Figure 12:
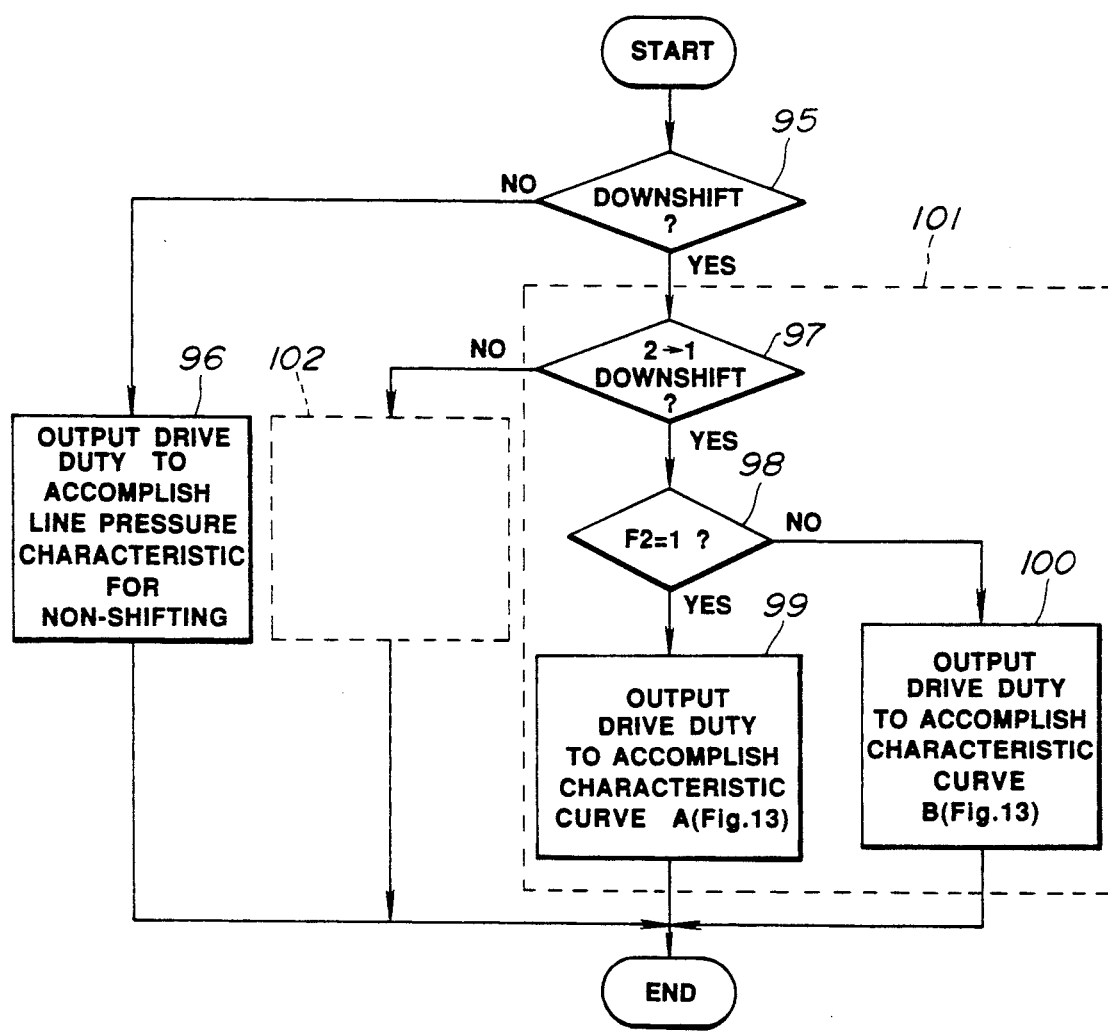

The line pressure deciding stage 25 shown in FIG. 7 executes the control program shown in FIG. 12 on the basis of the information on the opening degree of the throttle (TH) fed from the sensor 9 and the information on the type of the shift fed from the stage 16 to control the magnitude of the line pressure to the value that is neither excessive nor insufficient. Thus, it is checked in the step 95 to see whether the downshift is performed or not. If it is not the downshift, the line pressure characteristics for the corresponding non-shifting or upshift are retrieved in the step 96 ordinarily so as to control the line pressure by feeding the corresponding signal to the line pressure solenoid 13.

Figure 13:
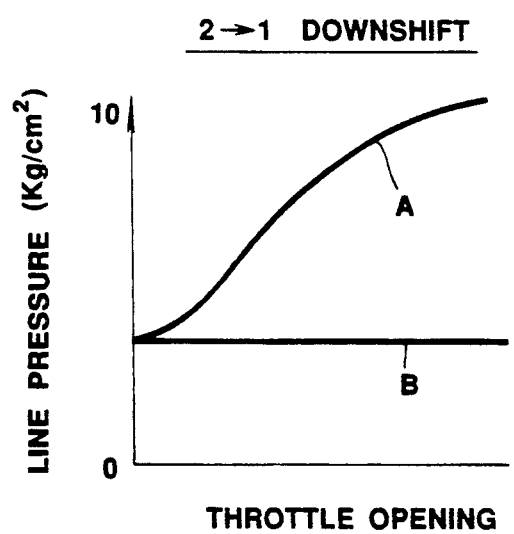
FIG. 13 is a graph showing different line pressure characteristics during a 2-1 downshift operation.

In the case of the downshift, it is checked in the step 97 to see whether or not the 2-1 downshift is performed. In the case of the 2-1 downshift, it is identified in the step 98 whether the shift is being performed (F2=1) or is terminated (F2=0). If the shift is being performed, the characteristics A in FIG. 13 are retrieved in the step 99, and the corresponding duty is fed to the line pressure solenoid 13 so as to obtain the line pressure in accordance with the throttle opening degree TH. After the shift operation is terminated, the characteristics B in FIG. 13 are retrieved in the step 100, and the corresponding duty is fed to the line pressure solenoid 13 so as to obtain the line pressure in accordance with the throttle opening degree TH.

Also at the time of the downshift other than 2-1 downshift, the same processing as that enclosed in the block 101 is performed in the step 102 for each type of the shift operation to perform the specified line pressure control.

What is claimed is:

1. In a drive system:
   an engine;
   a torque converter drivingly connected to said engine;
   an engine load sensor means for detecting a load on said engine and for generating an engine load indicative signal indicative of said detected load;
   an automatic transmission drivingly connected to said torque converter, said automatic transmission being subject to an upshift operation from one speed with a first gear ratio up to another speed with a second gear ratio in response to a shift command, said automatic transmission having a transmission input shaft drivingly connected to said torque converter and a transmission output shaft;
   transmission input revolution speed sensor means for detecting a revolution speed of said transmission input shaft and for generating a transmission input revolution speed indicative signal;
   transmission output revolution speed sensor means for detecting a revolution speed of said transmission output shaft and for generating a transmission output revolution speed indicative signal;
   means for determining a magnitude of a temporary drop in engine output in response to said shift command and said load indicative signal engine output including initiation of and termination of said temporary drop in engine output;
   means for determining an apparent gear ratio based on said transmission input and output revolution speed indicative signals and for generating an apparent gear ratio indicative signal indicative of said apparent gear ratio;
   means for repeatedly comparing said apparent gear ratio indicative signal with schedule a predetermined and for generating a comparison result indicative signal indicative of the comparison result; and
   means for subjecting said engine to said magnitude of temporary drop in engine output in response to said comparison result indicative signal.

2. A drive system as claimed in claim 1, wherein said schedule is expressed in terms of two gear ratio values falling between said first and second gear ratios and said engine is subject to said magnitude of temporary drop in engine output when said apparent gear ratio indicative signal falls between said two gear ratio values.

3. A drive system as claimed in claim 2, wherein said engine load sensor comprises throttle sensor means for detecting an opening degree of the engine throttle.

4. In a drive system:
   an engine;
   a torque converter drivingly connected to said engine;
   an automatic transmission drivingly connected to said torque converter, said automatic transmission being subject to a downshift operation from one speed with a first gear ratio down to another speed with a second gear ratio in response to a shift command, said automatic transmission having a transmission input shaft drivingly connected to said torque converter and a transmission output shaft;
   transmission input revolution speed sensor means for detecting a revolution speed of said transmission input shaft and for generating a transmission input revolution speed indicative signal;
   transmission output revolution speed sensor means for detecting a revolution speed of said transmission output shaft and for generating a transmission output revolution speed indicative signal;
   means for determining a temporary increase in engine output in response to said shift command;
   means for determining an apparent gear ratio based on said transmission input and output revolution speed indicative signals and for generating an apparent gear ratio indicative signal indicative of said apparent gear ratio;
   means for repeatedly comparing said apparent gear ratio indicative signal with said schedule and for generating a comparison result indicative signal indicative of the comparison result; and means for subjecting said engine to said temporal increase in engine output in response to said comparison result indicative signal.

5. A drive system as claimed in claim 4, wherein said schedule is expressed in terms of a predetermined gear ratio value falling between said first and second gear ratios, and said engine is subject to said temporary increase in engine output when said apparent gear ratio indicative signal falls between said first gear ratio and said predetermined gear ratio value.

6. A drive system as claimed in claim 5, further including means for subjecting line pressure to a temporary increase when said apparent gear ratio indicative signal falls between said first gear ratio and said predetermined gear ratio value.

7. A drive system as claimed in claim 5, further including means for subjecting said engine to a decrease in engine output for a predetermined period of time after said apparent gear ratio indicative signal has exceeded said predetermined gear ratio value.

8. A jolt control method for a drive system including an engine, a torque converter drivingly connected to the engine, and an automatic transmission drivingly connected to the torque converter, the automatic transmission being subject to an upshift operation from one speed with a first gear ratio up to another speed with a second gear ratio in response to a shift command, the automatic transmission having a transmission input shaft drivingly connected to the torque converter and a transmission output shaft, the jolt control method comprising the steps of:

detecting a load on said engine and generating an engine load indicative signal indicative of said detected load;

detecting a revolution speed of the transmission input shaft and generating a transmission input revolution speed indicative signal;

determining a magnitude of a temporary drop in engine output in response to the shift command and said load indicative signal a predetermined;

determining an apparent gear ratio based on said transmission input and output revolution speed indicative signals and generating an apparent gear ratio indicative signal indicative of said apparent gear ratio;

repeatedly comparing said apparent gear ratio indicative signal with said schedule and generating a comparison result indicative signal indicative of the comparison result; and subjecting the engine to said magnitude of temporary drop in engine output in response to said comparison result indicative signal.

9. A jolt control method for a drive system including an engine, a torque converter drivingly connected to the engine, an automatic transmission drivingly connected to the torque converter, the automatic transmission being subject to a downshift operation from one speed with a first gear ratio down to another speed with a second gear ratio in response to a shift command, the automatic transmission having a transmission input shaft drivingly connected to the torque converter and a transmission output shaft, the jolt control method comprising the steps of:

detecting a revolution speed of the transmission input shaft and generating a transmission input revolution speed indicative signal;

detecting a revolution speed of the transmission output shaft and generating a transmission output revolution speed indicative signal;

determining a temporary increase in engine output in response to the shift command and a schedule including termination of said temporal increase in engine output;

determining an apparent gear ratio based on said transmission input and output revolution speed indicative signals and generating an apparent gear ratio indicative signal indicative of said apparent gear ratio;

repeatedly comparing said apparent gear ratio indicative signal with said schedule and generating a comparison result indicative signal indicative of the comparison result; and subjecting the engine to said temporary increase in engine output in response to said comparison result indicative signal.

* * * * *